March 6, 1962     J. K. HINDS     3,023,771
CHECK VALVE
Filed March 8, 1960

INVENTOR.
John K. Hinds.

United States Patent Office 3,023,771
Patented Mar. 6, 1962

3,023,771
CHECK VALVE
John K. Hinds, P.O. Box 14015, Houston, Tex.
Filed Mar. 8, 1960, Ser. No. 13,645
2 Claims. (Cl. 137—454.2)

This invention relates generally to valves and specifically to improvements in one way check valves.

In the piping and control of highly corrosive and abrasive liquids, special materials are required for the manufacture of valves and other fittings which will be brought into continuous contact with such liquids. These materials are usually very costly and because of their resistant properties, are expensive to form into the desired shapes. In spite of careful choice of materials for such fittings as check valves, corrosion or erosion will take place and replacements become necessary. It is important therefore that the installation of replacements should involve a minimum of "down time" and should be available at reasonable cost.

It is therefore a primary object of this invention to provide a check valve which contains a replaceable valve insert designed for economy in material, and speed of installation.

It is a further object of this invention to provide a check valve which contains a replaceable valve seat and an independently replaceable set of valve flappers.

It is a still further object of this invention to provide a check valve which contains a replaceable valve assembly which is extremely efficient in operation and economical in replacement cost.

The invention consists of a cylindrical main body having a concentric bore. A counterbore is formed in one side of the body concentrically with the bore. A removable valve unit is slidingly received within the counterbore and retained therein by a disc plate which is bolted to the side of the main body. Aligned flange holes are formed through the main body and the disc plate for assembling the unit into a pipe circuit.

A full understanding of the construction of this invention, together with further features and advantages, will be had from the following detailed description of a preferred embodiment thereof, taken in conjunction with the attached drawings wherein.

Similar reference characters indicate corresponding parts throughout the several views in the drawing.

Figure 1:
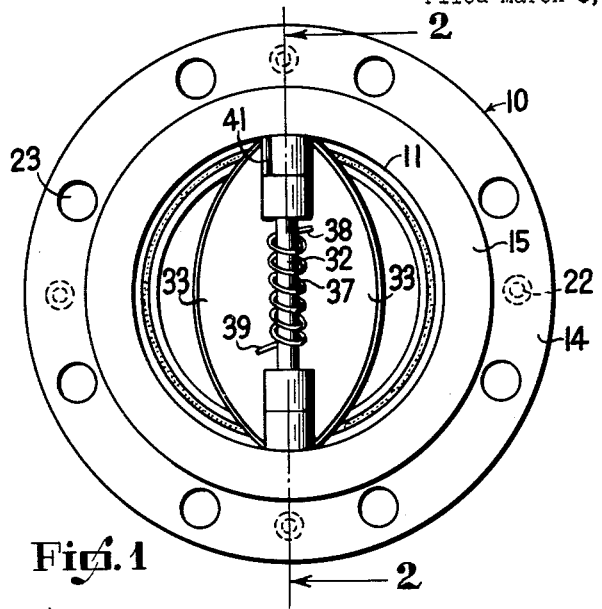
FIG. 1 is a plan view of the check valve showing the removable valve insert assembled in an open position.
Figure 2:
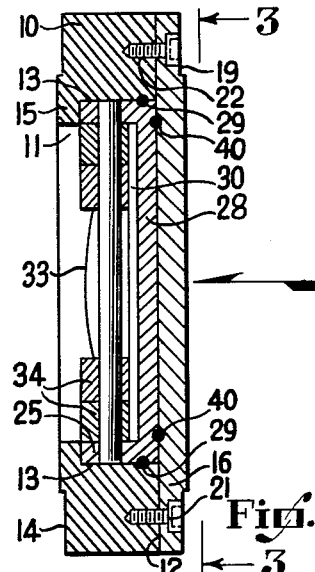
FIG. 2 is a cross sectional side elevation taken along the line 2—2 of FIG. 1.
Figure 4:
FIG. 4 is a plan view of two flapper plates which comprise the moving portion of the valve.
Figure 3:
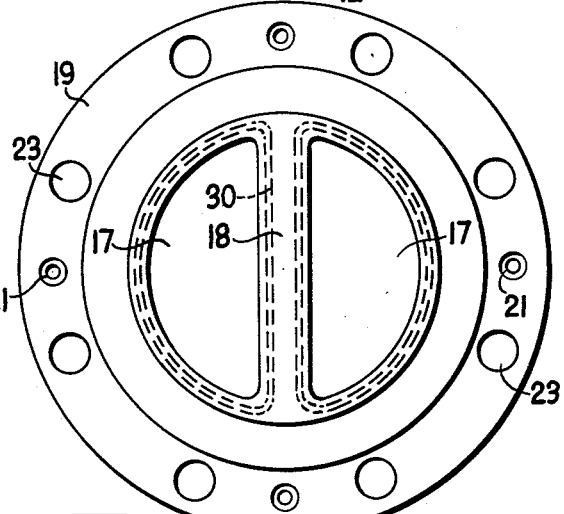
FIG. 3 is a view of the valve taken along the line 3—3 of FIG. 2.
Figures 5, 6:
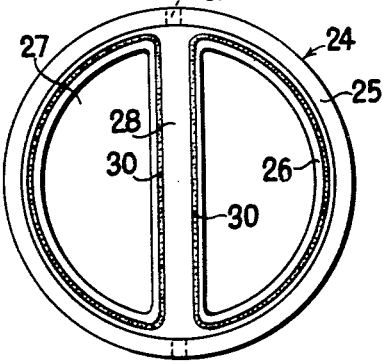
FIG. 5 is an end elevation of one of the flapper plates taken along the line 5—5 of FIG. 4.
FIG. 6 is a plan view of the removable valve seat with the flapper plates removed and showing the moulded flapper seal.

Referring now to the drawing in detail the numeral 10 represents a cylindrical main body having a concentrically formed bore 11. One side 12 of the body has a counterbore 13 formed concentrically around the bore 11. The other side 14 is provided with a protruding ring 15 adapted for abutting engagement with a pipe flange. A disc plate 16 is provided with two semi-circular openings 17 separated by a strip support 18 disposed diametrically of the disc plate 16. An annular recessed portion 19 surrounds the outer side of the disc plate 16 and is provided with four equally spaced countersunk holes 21 adapted to receive bolts 22 for securing the disc plate 16 to the side 12 of the main body 10. Eight equi-spaced pipe flange holes 23 are formed through the disc plate 16 and body 10 to receive bolts securing the check valve between standard flanges of adjacent pipe ends.

A removable valve seat 24 comprises a cylindrical sleeve 25 terminating at one end with a plate 26 having two semi-circular holes 27 formed therein separated by a strip support 28 adapted to align with the support 18 formed in the disc plate 16. The sleeve 25 is removably received in the counterbore 13 and is provided with a suitable O ring 29 to ensure a sound seal. Upstanding around the perimeter of the semi-circular holes 27 are two moulded valve seals 30. Two holes 31 are drilled diametrically through the sleeve 25 and are adapted to removably receive a bearing pin 32. A suitable O ring 40 is positioned between the outer side of the plate 26 and the inner side of the disc plate 16.

Two flapper plates 33 are semi-circular in shape and are provided with upstanding cylindrical hinge bosses 34 which extend from the diametric sides 35 of the plates. The bosses are positioned relative to each other such that on assembly, holes 36, formed between the end faces of each boss, align with each other to receive the bearing pin 32. A coil spring 37 is positioned centrally between the ends of the bearing pin 32, and opposite ends 38 and 39 of the spring are wound under torsion so as to bear with pressure on the faces of the opposing flapper plates 33. A stop pin 41 may be positioned as shown in FIG. 1, to control the extent of opening of the two flapper plates.

It will be appreciated from the above description that the valve insert is assembled as a separate unit comprising the valve seat 24, the two flapper plates 33, the bearing pin 32 and the bearing coil spring 37. Each of these parts are independently replaceable, but the novelty of the invention lies in the simple replacement of the entire insert. The disc plate 16 which retains the insert in position is removed by unscrewing the four bolts 22 and the valve seat 24 with its dependent parts assembled therein, is withdrawn from the counter bore 13. A new valve insert may be immediately installed in the counterbore and locked in position with the disc plate 16.

From the foregoing, it is believed that the construction, operation and advantages of this invention will be fully apparent. However, since numerous modifications will occur to those skilled in the art, it is not desired to limit the construction exactly to that shown and described, and accordingly, modifications and equivalents may be resorted to, falling within the scope of the appended claims.

I claim:
1. A one way check valve, comprising, a cylindrical main body having a concentric bore formed therethrough, pipe flange holes spaced around the perimeter of said body, a concentric counterbore extending inwardly from one side of said body, a disc plate having holes aligning with said pipe flange holes releasably secured to said one side of said main body, a removable valve unit consisting of a valve seat with openings formed therein, a cylindrical sleeve extending on one side of said seat and adapted to locate in said counterbore, flapper plates hingedly mounted on a pin extending diametrically through said sleeve and adapted to selectively close the openings in said valve seat, a spring biasing said flapper plates into a closed position, said valve unit retained within said counterbore by said disc plate.

2. A one way check valve, comprising, a cylindrical main body having a concentric bore formed therethrough, a concentric counterbore extending inwardly from one side of said body, a disc plate releasably secured to said one side of said body and having two semi-circular openings formed therethrough, aligned pipe flange holes extending through said body and said disc plate, a removable valve unit slidingly received within said counterbore and retained therein by said disc plate, said unit consisting of a valve seat having two openings adapted to align with said semi-circular openings, a cylindrical sleeve extending from one side of said seat and engaging the counterbore throughout its depth, flapper plates hingedly mounted on a pin extending diametrically through said sleeve, said plates adapted to selectively close over said two openings in said valve seat, and a spring biasing said flapper plates into a closed position.

References Cited in the file of this patent
UNITED STATES PATENTS

| | | |
|---|---|---|
| 1,257,011 | Morris | Feb. 19, 1918 |
| 1,393,204 | Daggett | Oct. 11, 1921 |
| 1,413,371 | Adler | Apr. 18, 1922 |

FOREIGN PATENTS

| | | |
|---|---|---|
| 781,036 | France | Feb. 18, 1935 |
| 900,119 | France | Sept. 18, 1944 |